United States Patent
Bailey

(10) Patent No.: US 6,521,322 B1
(45) Date of Patent: Feb. 18, 2003

(54) FOOD PACKAGE INSERT

(75) Inventor: Mark H. Bailey, Trophy Club, TX (US)

(73) Assignee: Bryan A. Netsch, Lewisville, TX (US)

(*) Notice: Subject to any disclaimer, the term of this patent is extended or adjusted under 35 U.S.C. 154(b) by 88 days.

(21) Appl. No.: 09/805,517

(22) Filed: Mar. 13, 2001

(51) Int. Cl.[7] .................................. B32B 3/06
(52) U.S. Cl. .................... 428/192; 428/43; 428/202; 428/195; 428/914
(58) Field of Search ............... 428/43, 202, 192, 428/195, 914

(56) References Cited

U.S. PATENT DOCUMENTS

| | | |
|---|---|---|
| 1,071,226 A | 8/1913 | Goodsell et al. |
| 2,783,172 A | 2/1957 | Avery |
| 3,153,868 A | 10/1964 | Jones |
| 3,385,748 A | 5/1968 | Neale et al. |
| 4,044,181 A | 8/1977 | Edhlund |
| 4,104,816 A | 8/1978 | Pingeton |
| 4,745,835 A | 5/1988 | Schnitzer |
| 4,797,291 A | 1/1989 | Pierce et al. |
| 4,837,956 A | 6/1989 | Delonce |
| 4,876,000 A | 10/1989 | Mikhail |
| 4,935,282 A | 6/1990 | Pawlowski et al. |
| 5,045,330 A | 9/1991 | Pawlowski |
| 5,273,798 A | 12/1993 | Miner |
| 5,344,190 A | 9/1994 | Volz |
| 5,501,491 A | 3/1996 | Thompson |
| 5,618,112 A | 4/1997 | Lovell |
| 5,776,586 A | 7/1998 | Lipper |
| 5,817,385 A | 10/1998 | Stanislav |
| 5,928,741 A | 7/1999 | Andersen et al. |
| 5,962,110 A | 10/1999 | Penke-Wevelhoff |
| 5,981,011 A | 11/1999 | Overcash et al. |
| 6,035,610 A | 3/2000 | Vonderhorst et al. |
| 6,127,012 A | 10/2000 | Nagatsuna et al. |

*Primary Examiner*—Alexander S. Thomas
(74) *Attorney, Agent, or Firm*—Luedeka, Neely & Graham PC

(57) ABSTRACT

The invention provides a food package insert made of a multi-layered structure having at least one removable edge portion. The multi-layered structure includes a cellulosic support web a cellulosic transfer web is disposed adjacent the support web. The transfer web contains a transferrable image attached thereto. A cellulosic release web having a release surface is disposed adjacent the transfer web. The release web has a food contact surface opposite the release surface. Each of the support web, transfer web and release web have first edge portions disposed in the removable edge portion of the multi-layered structure. The multi-layered structure is constructed with perforations which enable an elongate web to be separated into individual inserts for inserting in a food package.

11 Claims, 3 Drawing Sheets

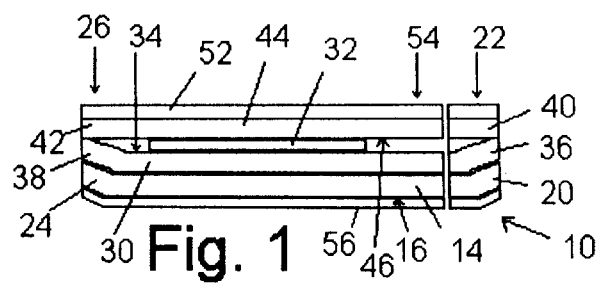
Fig. 1
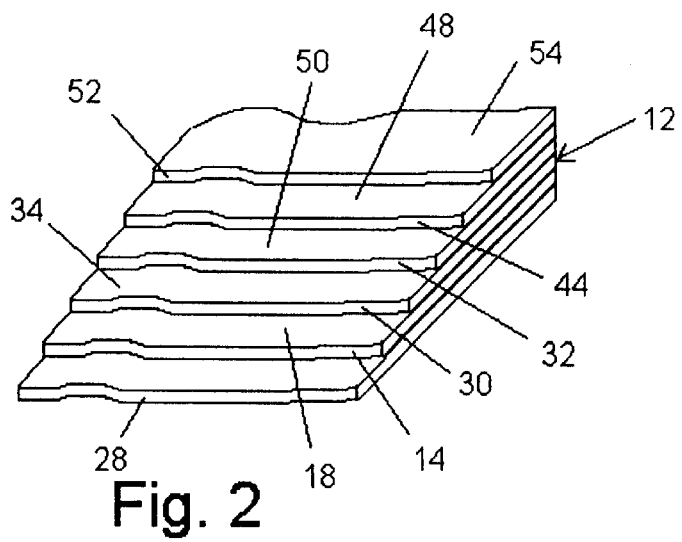
Fig. 2
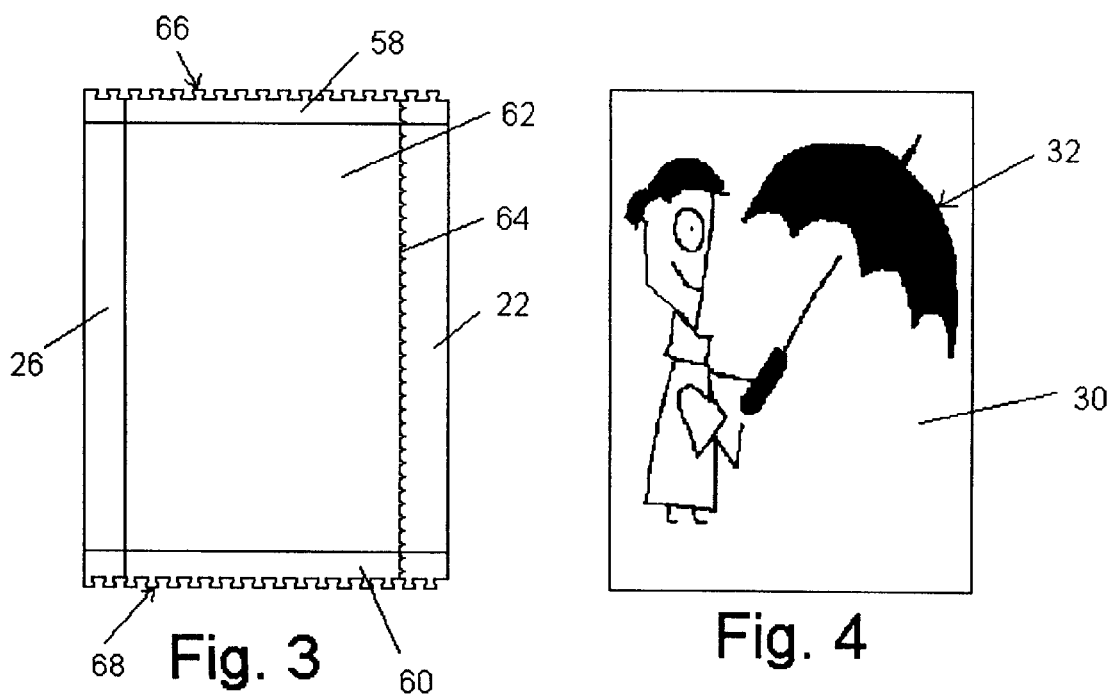
Fig. 3
Fig. 4

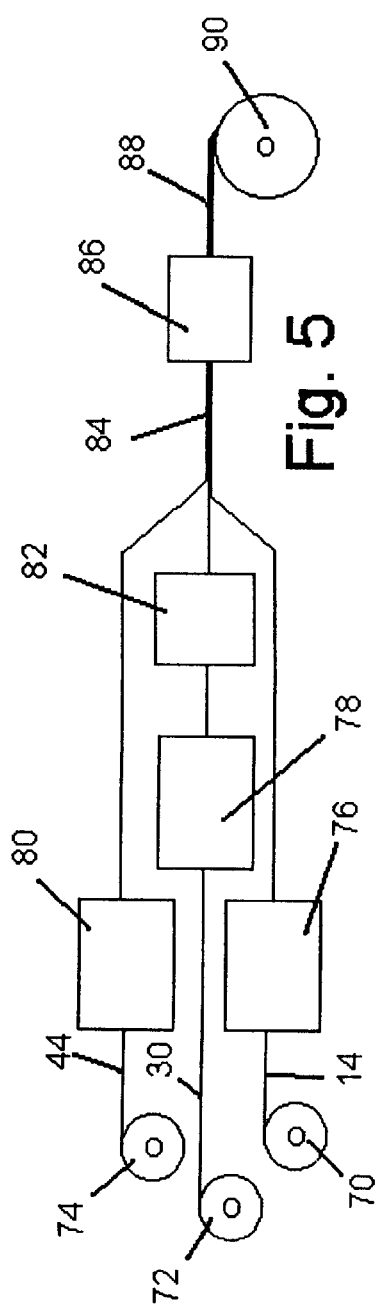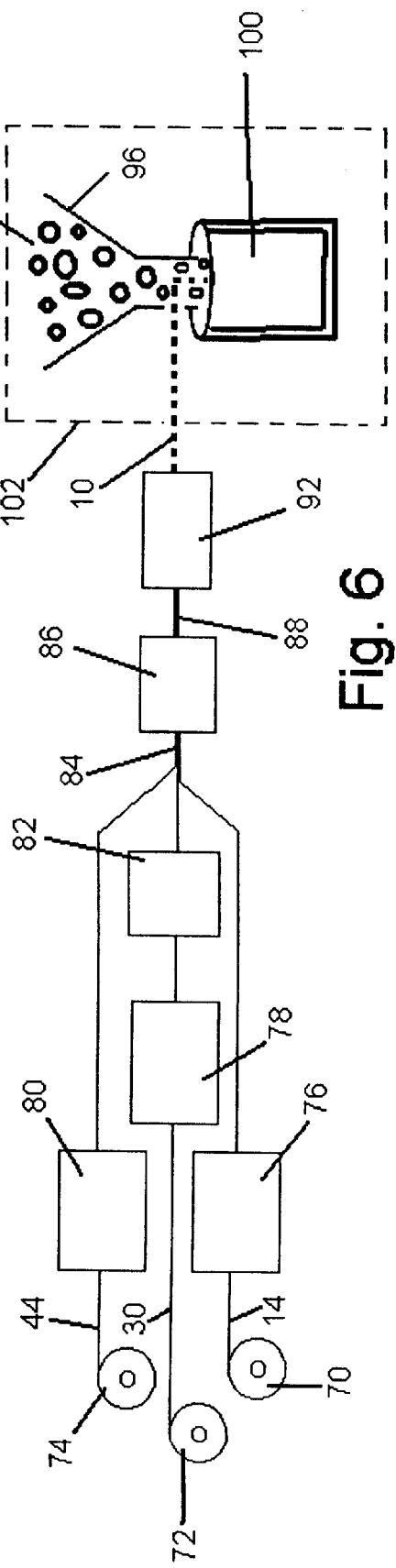

FOOD PACKAGE INSERT

FIELD OF THE INVENTION

The invention relates to a food package insert and more particularly to a multi-layered insert for food packages and methods for making the inserts.

BACKGROUND

Inserts for food packages have been used for a number of years for promotional and entertainment purposes, e.g. game pieces, prizes and the like. In order to protect food in the packages from contamination from the inserts, the inserts are typically sealed in an impervious film envelope, e.g., the inserts are over-wrapped with a protective barrier film. The barrier film not only protects the food from contamination but also reduces the absorption of oil, grease and/or moisture from the food which can soil or damage a printed insert. However, over-wrapping the insert is a secondary, independent process that is conducted after printing the insert. Accordingly, over-wrapping adds costs and time to provide a finished over-wrapped insert product.

Because of the over-wrapping, the insert must be smaller so that the overall over-wrapped insert meets particular size criteria. In some cases, the over-wrapping is damaged or not properly sealed thereby leading to damage of the insert. Another problem with over-wrapped inserts is that the over-wrapping may pose a choking hazard for small children. The plastic over-wrap is typically not water soluble and if ingested by a child may cause injury or death.

Accordingly, there is a need for inserts for food packages which are safe for children and which can be produced in high volume with a relatively low cost. There is also a need for a method for producing game or prize inserts for food packages which will not contaminate the food and are not soiled by the food itself.

SUMMARY OF THE INVENTION

With regard to the foregoing and other objects and advantages, the invention provides a food package insert made of a multi-layered structure having at least one removable edge portion. The multi-layered structure includes an oil and grease resistant cellulosic support web having first and second surfaces and a first support web edge portion disposed adjacent the removable edge portion of the multi-layered structure. A cellulosic transfer web is disposed adjacent the second surface of the support web. The transfer web contains a transferrable image attached to a first surface thereof and a first transfer web edge portion disposed adjacent the removable edge portion of the multi-layered structure. A cellulosic release web having a release surface is disposed adjacent the first surface of the transfer web. The release web has a food contact surface opposite the release surface and a first release web edge portion disposed adjacent the removable edge portion of the multi-layered structure. The first edge portions of the support web, transfer web and release web are adhesively attached to one another to provide the multi-layered structure having at least one removable edge portion.

In another aspect, the invention provides a method for making a food safe food package insert having at least one removable edge portion. The method includes printing a transferrable image on a first surface of a transfer web made of cellulosic materials. The transfer web containing a first transfer web edge portion disposed in the removable edge portion of the insert. A cellulosic support web is attached to a second surface of the transfer web, the support web being made of a cellulosic oil and grease resistant material, wherein the cellulosic support web contains a first support web edge portion disposed in the removable edge portion of the insert. A cellulosic release web is attached to the first surface of the transfer web. The release has a food contact surface and an inner surface opposite the food contact surface, the inner surface being releasably attached to the transferrable image. A first release web edge portion is disposed in the removable edge portion of the insert thereby providing a laminate web.

An important advantage of the food package insert of the invention is that the entire assembly is made of cellulosic materials, food grade inks and adhesives. Another advantage is that the insert may be made of completely water soluble materials without the need for over-wrapping or placing the insert in an impervious envelope. This feature enables a plurality of inserts to be made from an elongate web and detached from the elongate web at the point the inserts are place in food containers. Accordingly, the entire process for making the elongate webs may be provided by a continuous printing and laminating unit.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein:

FIG. 1 is a cross-sectional view through a laminate made according to the invention;

FIG. 2 is a perspective view of portions of layers of a food insert according to the invention;

FIG. 3 is a plan view of a food insert according to the invention;

FIG. 4 is a plan view of a transferrable image for a food insert according to the invention;

FIG. 5 is a schematic flow diagram for a process for making a laminate according to the invention; and FIG. 6 is a schematic flow diagram for a process for making a laminate according to the invention and inserting the laminate in a food product.

DETAILED DESCRIPTION OF THE PREFERRED EMBODIMENTS

Figure 1A:
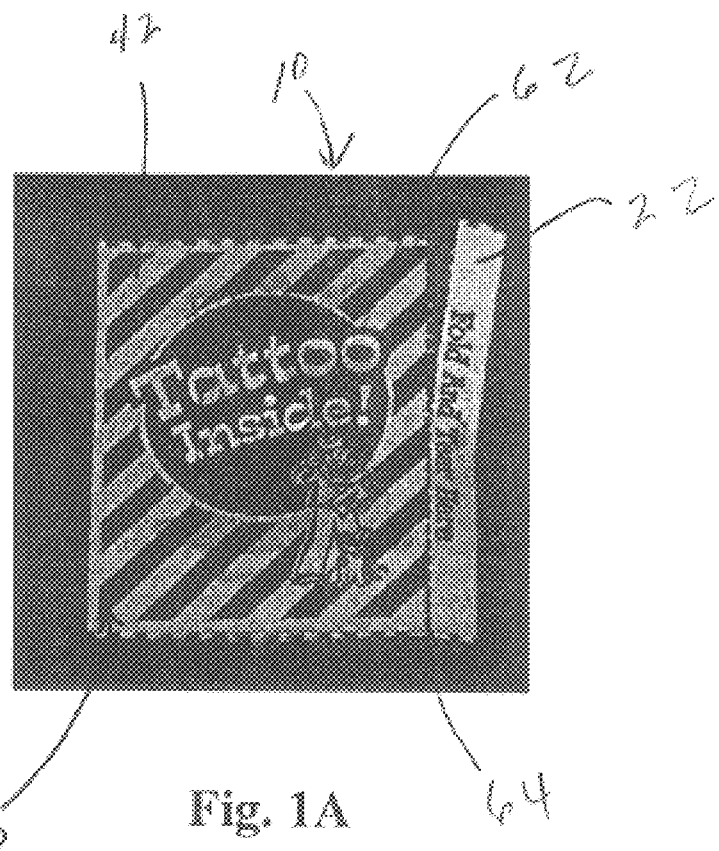
FIG. 1A is a plan view of an insert made according to the invention with a removable edge portion partially removed.

With initial reference to FIGS. 1–4, a food insert 10 according to the invention is provided by a multi-layered structure 12 including a cellulosic support web 14 preferably made of an oil and grease resistant (OGR) web having a first surface 16 and a second surface 18. A first support web edge portion 20 of the support web 14 is disposed in at least one removable edge portion 22 and second support web edge portion 24 is disposed in an edge portion 26 opposite the removable edge portion 22 which may be a fixed edge portion or a removable edge portion of the multi-layered structure 12. The support web 14 is preferably a relatively heavy weight paper or paperboard material which is treated so as to be substantially oil and grease resistant and is approved for direct food contact. For the purposes described herein, the support web 14 cannot be treated with chemicals which are leachable from the web and are harmful if ingested. A particularly preferred support web 14 is a 50 pound per ream OGR web made by Badger Paper Mills, Inc. of Peshtigo, Wis. The oil and grease resistance of the support web 14 may be provided by incorporating suitable chemicals in the web during manufacture of the web or by applying a layer 28 of oil and grease resistant material, such as polypropylene to the first surface 16 of the support web.

A cellulosic transfer web 30 is disposed adjacent the second surface 18 of the support web 14. The transfer web 30 preferably includes a transferrable image 32 removably attached to a first surface 34 of the transfer web 30. The transfer web 30 has a first transfer web edge portion 36 disposed in the removable edge portion 22 and a second transfer web edge portion 38 disposed in the fixed or removable edge portion 26 of the multi-layered structure 12. The transfer web 30 is preferably a coated web suitable for incidental food contact. The edge portions 36 and 38 preferably contain adhesives on both surfaces thereof to adhesively attach the edge portions 36 and 38 to the edge portions 20 and 24 of the support web and to first and second edge portions 40 and 42 of a release web 44. A particularly preferred transfer web 30 is available from Crown Vantage, Inc. of Cincinnati, Ohio as Crown Vantage Grade QR27XB.

The upper layer of the multi-layered structure 12 is preferably a cellulosic release web 44 having a release surface 46 adjacent the first surface 34 of the transfer web and a food contact surface 48 opposite the release surface 46. As described above, the first release web edge portion 40 is disposed in the removable edge portion 22 and the second release web edge portion 42 is disposed in the fixed or removable edge portion 26 of the multi-layered structure 12. The release web 44 is preferably suitable for direct food contact and is desirably also grease and oil resistant. A preferred release web 44 is available from Crown Vantage, Inc. as 27 pound per ream Transfer Stock. The release surface 46 of the release web 44 should be treated to inhibit the transferable image 32 from setting into the release web 44 so that the release web 44 is removable from a surface 50 of the image. The oil and grease resistance of the release web 44 may be provided by incorporating suitable chemicals in the web during manufacture of the web or by applying a layer 52 of oil and grease resistant material, such as polypropylene to the food contact surface 48 of the release web 44.

The first surface 16 of the support web 14, the food contact surface 48 of the release web 44 and/or the food contact surfaces 54 and 56 of the polypropylene layers 52 and 28, respectively, are preferably printed with non-toxic inks suitable for direct food contact. The non-toxic inks are preferably water soluble inks which exhibit excellent adhesion and abrasion resistance when applied to cellulosic webs and to medium, low or high density treated polyethylene, polypropylene, cellophane, foils and the like. Such inks are available from Colorcon, Inc. of West Point, Pa. under the trade name NT-23.

The second surface 18 of the support web 14 and the release surface 46 of the release web 44 may also be printed with inks which are suitable for indirect food contact. Such inks are also preferably non-toxic inks which are sanctioned by the Food & Drug Administration (FDA) and the United States Department of Agriculture (USDA) as acceptable for minimal food contact applications. The inks are water-based and comply with Environmental Protection Agency (EPA) regulations. Such inks may be applied to the surfaces 18 and 46 by flexographic and gravure printers and are available from Colorcon, Inc. under the trade name FLEXICRAFT.

Figure 1B:
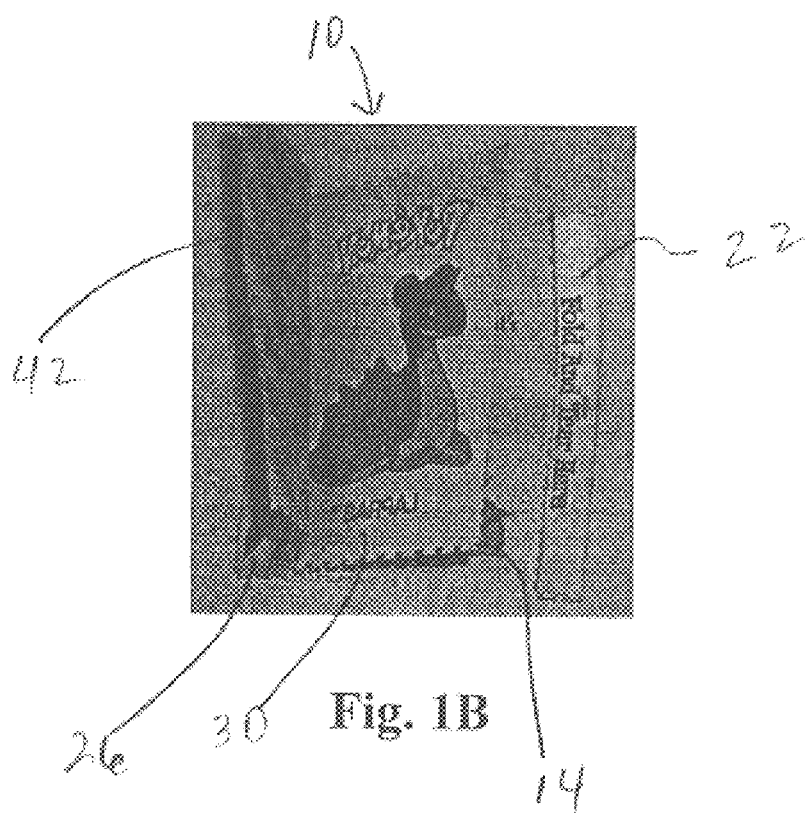
FIG. 1B is a perspective view of an insert made according to the invention with a removable edge portion removed and individual layers exposed.

The transferrable image 32 (FIG. 4) is preferably printed with a cosmetic to grade ink available from Colorcon, Inc. under the trade name NT-19. A suitable cosmetic grade ink includes caster oil, ethyl cellulose, iron oxide pigment, FD&C Yellow #5 aluminum lake, FD&C blue#1 aluminum lake and FD&C red#1 calcium lake is preferably releasable from the transfer web 30 to provide the transferable image 32 such as a decal or tattoo 32 by wetting or soaking the transfer web 30 in water for about 30 seconds and removing the web 30 from the image 32. FIG. 3 is an illustration the transferable image 32 releasable from the transfer web 30 for applying to a surface such as skin, paper, plastic metal and the like. As seen in FIG. 1B, the image 32 may be printed as a mirror image 32 so that upon application to a surface, the image 32 is seen properly.

The adhesive used to attach the support web 14 and the release web 44 to the transfer web 30 in the removable edge portion 22 and the fixed or removable edge portion 26 of the multi-layered structure is preferably a low odor adhesive suitable for indirect food contact. Such adhesives are preferably aqueous adhesives based upon ethylene/vinyl acetate emulsions, polyvinyl alcohols, acrylic and polyurethane dispersions and emulsions available from Croda Adhesives, Inc. of Itasca, Ill. under the trade name CRODAFIX 57-174. As set forth above, the adhesive is preferably applied only in the edge portions 22 and 26 of the multi-layered structure 12. However, for applications requiring the multi-layered structure to be inserted in a salty food snack such as potato chips and the like, it is desirable to also apply the adhesive to both sides of the transfer web 30 in opposing edge portions 58 and 60 (FIG. 3) so that the interior of the multi-layered structure 12 containing image 32 is sealed on all four edge portions from the food.

The removable edge portion 22 is preferably separable from a main portion 62 of the multi-layered structure 12 by perforated seam 64. A partially removed edge portion 22 is illustrated in FIG. 1A. Any perforations suitable for aiding separation of the edge portion 22 from the main portion 62 may be used. It will be recognized that a perforated seam such as seam 64 may also be used for edge portion 26 in the instance where edge portion 26 is a removable edge portion rather than a fixed edge portion.

A particularly important feature of the invention are perforations 66 and 68 on the opposing edge portions 58 and 60, respectively. Perforations 66 and 68 are disposed in an elongate multi-layered web 12 to provide individual inserts 10 containing removable images 32. The perforations 66 and 68 enable the inserts 10 to be separated from one another during a food package insertion process described in more detail below. is The perforations 66 and 68 must be sufficient to hold individual inserts 10 together in an elongate multi-layered web 12, yet the inserts 10 must be readily separable from one another for automatic placement of the inserts 10 in a food package. Accordingly, the burst strength or tensile strength of the perforations is preferably in the range of from about 6 to about 16 pounds per lineal inch of perforations 66 and 68 on opposing edge portions 58 and 60. The burst strength of a line of perforations is generally determined by the ratio of cut and tie of a perforation in the line of perforations, by the sharpness of the perforating blade or wheel, the pressure of the perforator, and the paper quality. A particularly preferred perforation 66 or 68 is known as a castle perf. The cut of the perforating blade for such a castle perf preferably ranges from about 0.05 to about 0.09 inches and the tie of the castle perf preferably ranges from about 0.04 to about 0.08 inches. A particularly preferred castle perf has a cut of 0.0781 inches and a tie of 0.0625 inches. To meet the desired burst strength based on the tensile strength of the substrate, a shim is added between the perf blades. The shim preferably has a thickness ranging from about 0.001 to about 0.002 inches. Opposing edge portions 58 and 60 may contain adhesives such as food grade pressure sensitive adhesives between the layers of the multi-layered structure in order to provide enhanced protection of the printed images and foods.

With reference to FIGS. 5 and 6, methods for making the food package inserts 10 and methods for placing the inserts 10 in food packages will now be described. The multi-layered web 12 is preferably formed from individual elongate webs fed from feed rolls 70, 72 and 74. Roll 70 provides the cellulosic support web 14, roll 72 provides the transfer web 30 and roll 74 provides the release web 44. Each of the webs 14, 30 and 44 are processed through multiple printing units represented by rectangles 76, 78 and 80. The printing units, for example, may include from one to sixteen units to apply black, cyan, magenta, yellow and/or opaque white inks to each side of the webs. The printing units represented by rectangle 76 provide printing to the first and second surfaces 16 and 18 of the support web 14. The printing units represented by rectangle 78 provide printing including the image 32 to the first surface 34 of the transfer web 30 and printing to the opposing surface of web 30 which may include instructions on how to effect transfer of the transferrable image 32. The printing units represented by rectangle 80 provide printing to the release surface 46 of release web 44 and to the food contact surface 48 of release web 44.

Web 30 is also passed through an adhesive unit 82 which may be one or two printing units which apply adhesives to the opposing surfaces of web 30 in the removable edge portion 36 and the second edge portion 38 of the transfer web 30. Adhesive units may also be used to apply adhesive to the opposing edge portions 58 and 60 of the transfer web 30.

Once the adhesive is applied to the transfer web edge portions 36 and 38 and optionally 58 and 60, the webs 14 and 44 are adhesively attached to the transfer web 30 to provide an elongate composite web 84. If desired, to improve the oil and grease resistance of inserts 10 made from the composite web, polymeric layer 28 and 52 such as polypropylene may be applied to the first surface 16 of the support web 14 and to the food contact surface 48 of the release web 44 by an extruder, printing unit or coater. The amount of polymeric layer 28 and 52 preferably ranges from about 0.05 to about 1.5 mils providing a polymeric layer thickness ranging from about 0.5 to about 1.5 mils.

After the composite web 84 is formed, with or without the polymeric layers 28 and 52, the composite web 84 is perforated in a perfing unit 86 to provide individualized inserts which may be removed from the elongate composite web 84. The perforated web may then be rolled on a transfer roll 90 for transportation to a food packaging plant (FIG. 5). In the alternative, a perforated web 88 may be fed directly to an in-pack machine 92 which separates individual inserts 10 from the web 88 and disposes the inserts 10 in a former funnel 96 of a food package filling machine 102. Since the package filling machine 102 and the printing units 76, 78 and 80, adhesive unit 82 and perfing unit 86 do not typically run at the same speed as the package filling machine 102, multiple package filling machines 102 may be provided in line with the manufacture of the perforated web 88.

In the food packaging machine 102, the insert 10 is combined with food 98 as food packages 100 are being filled on a continuous basis. Accordingly, the insert 10 of the invention is adaptable to a continuous operation which provides inserts from an elongate roll 88 formed in a separate operation or in a separate location and inserts 10 formed directly from the printing and perfing machines in the same location as the food packaging machine 102. Elimination of the over-wrapping step also provides an improved food package insert as described above thereby reducing operating and equipment costs for providing such inserts 10.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A food package insert comprising a multi-layered structure having at least one removable edge portion, the multi-layered structure including an oil and grease resistant cellulosic support web having first and second surfaces, the support web having a first support web edge portion disposed adjacent the removable edge portion of the multi-layered structure; a cellulosic transfer web adjacent the second surface of the support web, the transfer web containing a transferrable image attached to a first surface thereof and having a first transfer web edge portion disposed adjacent the removable edge portion of the multi-layered structure and a cellulosic release web having a release surface adjacent the first surface of the transfer web, a food contact surface opposite the release surface and a first release web edge portion disposed adjacent the removable edge portion of the multi-layered structure, wherein the first edge portions of the support web, transfer web and release web are substantially adhesively attached to one another to provide the multi-layered structure having at least one removable edge portion.

2. The food package insert of claim 1 further comprising a plurality of food package inserts removably attached to one anther along opposing edges thereof to provide an elongate strip.

3. The food package insert of claim 2 wherein the opposing edges of the package inserts are perforated along the elongate strip to provide the plurality of package inserts.

4. The food package insert of claim 3 wherein the perforated edges comprise castle-shaped perforations.

5. The food package insert of claim 4 wherein the perforated edges have a tensile strength ranging from about 6 to about 1.6 pounds per lineal inch of the perforated edge.

6. The food package insert of claim 4 wherein a cut length of the perforations ranges from about 0.05 to about 0.09 inches and a tie length of the perforations ranges from about 0.04 to about 0.08 inches.

7. The food package insert of claim 1 further comprising a thermoplastic coating disposed on the first surface of the support web and on the food contact surface of the release web.

8. The food package insert of claim 1 wherein the transferable image comprises a tattoo.

9. The food package insert of claim 1 wherein the transferable image comprises decalcomania.

10. The food package insert of claim 1 having a fixed edge portion opposite the removable edge portion, wherein a second support web edge portion, a second transfer web edge portion and a second release web edge portion are disposed adjacent the fixed edge portion of the multi-layered structure.

11. The food package insert of claim 1 having a second removable edge portion opposite the at least one removable edge portion, wherein a second support web edge portion, a second transfer web edge portion and a second release web edge portion are disposed adjacent the second removable edge portion of the multi-layered structure.

* * * * *